US012785383B2

(12) United States Patent
Ostheim-Dzerowycz et al.

(10) Patent No.: US 12,785,383 B2
(45) Date of Patent: Nov. 3, 2026

(54) AC FREEWHEELING

(71) Applicant: Advanced Energy Industries, Inc., Denver, CO (US)

(72) Inventors: Michael Ostheim-Dzerowycz, Warstein (DE); Christian Schaffarra, Rüthen (DE)

(73) Assignee: Advanced Energy Industries, Inc., Denver, CO (US)

(*) Notice: Subject to any disclaimer, the term of this patent is extended or adjusted under 35 U.S.C. 154(b) by 238 days.

(21) Appl. No.: 18/620,598

(22) Filed: Mar. 28, 2024

(65) Prior Publication Data

US 2025/0309633 A1 Oct. 2, 2025

(51) Int. Cl.
*H02H 9/04* (2006.01)
*H02H 1/00* (2006.01)

(52) U.S. Cl.
CPC ............ *H02H 9/04* (2013.01); *H02H 1/0007* (2013.01)

(58) Field of Classification Search
CPC .......... H02H 9/04; H02H 1/0007; H02H 3/06; H02H 3/20
See application file for complete search history.

(56) References Cited

U.S. PATENT DOCUMENTS 11,522,465 B1 12/2022 Schaffarra et al.
11,791,738 B2 10/2023 Schaffarra et al.
2020/0366079 A1* 11/2020 Telefus .................... H02H 3/08

* cited by examiner

*Primary Examiner* — Daniel Cavallari
(74) *Attorney, Agent, or Firm* — NOD Law PC

(57) ABSTRACT

This disclosure describes systems, methods, and apparatuses for preventing over-voltage conditions, the method comprising: monitoring, using a freewheeling circuit, a load voltage across a load, wherein the load is configured to receive power from a power supply; monitoring a freewheeling current in the freewheeling circuit; and controlling a state of the freewheeling circuit, based at least in part on one or more of comparing the load voltage to a voltage threshold, and comparing the freewheeling current to at least one current threshold.

17 Claims, 11 Drawing Sheets

AC FREEWHEELING

FIELD OF THE DISCLOSURE

The present disclosure relates generally to power supplies. Specifically, but without limitation, the present disclosure relates to systems, methods, and apparatuses for preventing overvoltage conditions.

DESCRIPTION OF RELATED ART

Some power supplies, such as, alternating current (AC) power supplies or pulsed power supplies, can be employed in systems having an inductive load. In some circumstances, if the power connected to the inductive load is switched OFF, the current in the inductive load may not instantly drop down to zero. In such cases, if there is no current path for the current in the inductive load, the energy stored in the inductive load may cause a high voltage to be built up at the output/inductive load. In some instances, this resultant voltage may be higher than the maximum voltage output by the power supply and/or the voltage output by the power supply during normal operating conditions. Such overvoltage conditions are not only detrimental to user safety but may also result in damage of one or more other components (e.g., switches, diodes, etc., of the power controller) connected to the inductive load.

In some cases, a freewheeling diode may be coupled across (i.e., in parallel to) direct current (DC) powered loads to provide a decay or discharge path for the current. However, with AC power, it is impractical to use diodes alone, as they would short the power source. Currently used techniques (non-controlled solutions) for AC powered loads are lacking in several regards, as they involve additional losses, additional oscillations, and/or are not capable of withstanding continuous switching. Some techniques, referred to as controlled solutions, also suffer from some deficiencies. For instance, some controlled techniques, require additional synchronous driven switching elements, which can add to the cost and/or complexity of the system.

Thus, there is a need for a refined method and system for preventing overvoltage conditions and/or for providing a decay path for current flow when the power source connected to an inductive load is switched OFF, which can help enhance power supply performance, as compared to the prior art.

The description provided in the description of related art section should not be assumed to be prior art merely because it is mentioned in or associated with this section. The description of related art section may include information that describes one or more aspects of the subject technology.

SUMMARY OF THE DISCLOSURE

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

Aspects of the present disclosure generally relate to systems, methods, and apparatuses for preventing overvoltage conditions and/or for providing a decay path for current flow, for instance, when a power source (e.g., alternating current (AC) power source) connected to an inductive load is turned OFF. In some circumstances, when the power connected to an inductive load is switched OFF, the current flow in the inductive load may not stop immediately and may need to be conducted until it is decayed to prevent buildup of a high voltage (e.g., exceeding the voltage of the power source) at the inductive load.

Existing techniques for preventing such overvoltage conditions are lacking in several regards. For example, one such technique utilizes a transient voltage suppressor (TVS) diode across the load. While the use of a TVS diode helps with fast current decay and limiting the voltage at the inductive load, TVS diodes are typically not designed for periodic signal shaping, making them impractical in certain use cases. Another technique involves the use of a resistor in parallel with the inductive load. The use of a resistor with a relatively small resistance value can allow for good signal shaping but may nonetheless result in unwanted high losses. Another prior art technique utilizes a resistor-capacitor (RC) snubber. This, however, may lead to extra oscillations of the voltage and current waveforms, which may adversely impact system performance. In yet other cases, a plurality of transistor switches (e.g., Metal-oxide semiconductor field effect transistors or MOSFETs) may be provided, and a controller may be used to turn ON/OFF the switches. In some cases, this freewheeling with controlled switches may need to be designed to be fail safe, e.g., during controller reset, over current handling, or other disturbances.

Broadly, aspects of the present disclosure are directed to systems, methods, apparatuses, and storage media for implementing AC freewheeling in a power system, where the power system comprises a power source (e.g., AC power source or supply), a power controller, an inductive load, and a freewheeling circuit, further described below with reference to FIGS. 1-7. A switch controller in the freewheeling circuit may be used to open or close a switch in the freewheeling circuit and thereby deactivate or activate freewheeling. In some embodiments, the freewheeling circuit may be implemented as a separate circuit coupled at the output end (e.g., across the inductive load) of the power system. Alternatively, the freewheeling circuit can be implemented within the power controller, where the power controller may be coupled between the input power source and the inductive load.

In some aspects, the techniques described herein relate to a method for preventing over-voltage conditions, including: monitoring, using a freewheeling circuit, a load voltage across a load, wherein the load is configured to receive power from a power supply; monitoring a freewheeling current in the freewheeling circuit; and controlling a state of the freewheeling circuit, based at least in part on one or more of: comparing the load voltage to a voltage threshold; and comparing the freewheeling current to at least one current threshold.

In some aspects, the techniques described herein relate to a method, wherein controlling the state of the freewheeling circuit includes: in response to detecting that the load voltage exceeds the voltage threshold, turning ON at least a portion of the freewheeling circuit to active freewheeling.

In some aspects, the techniques described herein relate to a method, wherein controlling the state of the freewheeling circuit includes: in response to detecting that the freewheeling current is at or below a first current threshold, turning OFF at least a portion of the freewheeling circuit to deactivate freewheeling.

In some aspects, the techniques described herein relate to a method, wherein controlling the state of the freewheeling circuit includes: in response to detecting that the freewheeling current exceeds a second current threshold, turning OFF at least a portion of the freewheeling circuit to deactivate freewheeling.

In some aspects, the techniques described herein relate to a method, wherein: the first current threshold is low enough to ensure that the load voltage is below the voltage threshold when the at least the portion of the freewheeling circuit is turned OFF; and the second current threshold corresponds to a short circuit current of the freewheeling circuit.

In some aspects, the techniques described herein relate to a method, wherein: turning ON at least a portion of the freewheeling circuit includes closing a switch in the freewheeling circuit to activate freewheeling; and turning OFF at least a portion of the freewheeling circuit includes opening a switch in the freewheeling circuit to deactivate freewheeling.

In some aspects, the techniques described herein relate to a method, wherein: the voltage threshold includes a maximum voltage output by the power supply; and the at least one current threshold includes a first current threshold and a second current threshold higher than the first current threshold.

In some aspects, the techniques described herein relate to a method, further including providing the freewheeling circuit, wherein providing the freewheeling circuit includes one of: coupling the freewheeling circuit to the load; or integrating the freewheeling circuit with a power controller, wherein the power controller is coupled between the load and the power supply.

In some aspects, the techniques described herein relate to a method, wherein the load includes an inductive load, and wherein the power supply includes one of an alternating current (AC) power supply or a pulsed power supply.

In some aspects, the techniques described herein relate to a method, wherein controlling the state of the freewheeling circuit includes: in response to detecting that a power controller coupled to the power supply is turned ON while freewheeling is active, opening a switch of the freewheeling circuit to deactivate freewheeling.

In some aspects, the techniques described herein relate to a freewheeling circuit for preventing over-voltage conditions, including: a switch; electrical damping coupled in series with the switch; and a freewheeling controller, wherein the freewheeling controller is configured to: monitor a load voltage across a load, wherein the load is configured to receive power from a power supply; monitor a current in the freewheeling circuit; and control a state of the freewheeling circuit, based at least in part on one or more of: comparing the load voltage to a voltage threshold; and comparing the current to at least one current threshold.

In some aspects, the techniques described herein relate to a freewheeling circuit, wherein controlling the state of the freewheeling circuit includes: in response to detecting that the load voltage exceeds the voltage threshold, closing the switch of the freewheeling circuit to activate freewheeling.

In some aspects, the techniques described herein relate to a freewheeling circuit, wherein controlling the state of the freewheeling circuit includes: in response to detecting that the current is at or below a first current threshold, opening the switch of the freewheeling circuit to deactivate freewheeling.

In some aspects, the techniques described herein relate to a freewheeling circuit, wherein controlling the state of the freewheeling circuit includes: in response to detecting that the current exceeds a second current threshold, opening the switch of the freewheeling circuit to deactivate freewheeling.

In some aspects, the techniques described herein relate to a freewheeling circuit, wherein: the first current threshold is low enough to ensure that the load voltage is below the voltage threshold when the switch is opened; and the second current threshold corresponds to a short circuit current of the freewheeling circuit.

In some aspects, the techniques described herein relate to a freewheeling circuit, wherein: the voltage threshold includes a maximum voltage output by the power supply; and the at least one current threshold includes a first current threshold and a second current threshold higher than the first current threshold.

In some aspects, the techniques described herein relate to a freewheeling circuit, wherein the freewheeling circuit is one of: directly coupled to the load; or integrated with a power controller, wherein the power controller is coupled between the load and the power supply; and wherein: the load includes an inductive load, the power supply includes one of an alternating current (AC) power supply or a pulsed power supply, and the electrical damping includes at least one resistor.

In some aspects, the techniques described herein relate to a freewheeling circuit, wherein controlling the state of the freewheeling circuit includes: in response to detecting that a power controller coupled to the power supply is turned ON while freewheeling is active, opening the switch of the freewheeling circuit to deactivate freewheeling.

In some aspects, the techniques described herein relate to a non-transitory, tangible computer readable storage medium, encoded with processor readable instructions to perform a method for preventing over-voltage conditions, the method including: monitoring, using a freewheeling circuit, a load voltage across a load, wherein the load is configured to receive power from a power supply; monitoring a freewheeling current in the freewheeling circuit; and controlling a state of the freewheeling circuit, based at least in part on one or more of: comparing the load voltage to a voltage threshold; and comparing the freewheeling current to at least one current threshold.

In some aspects, the techniques described herein relate to a non-transitory, tangible computer readable storage medium, wherein: the voltage threshold includes a maximum voltage output by the power supply; the at least one current threshold includes a first current threshold and a second current threshold higher than the first current threshold; the load includes an inductive load; the power supply includes one of an alternating current (AC) power supply or a pulsed power supply; and wherein controlling the state of the freewheeling circuit includes: in response to detecting that the load voltage exceeds the voltage threshold, closing a switch of the freewheeling circuit to activate freewheeling; in response to detecting that the freewheeling current is at or below the first current threshold, opening the switch of the freewheeling circuit to deactivate freewheeling; and in response to detecting that the freewheeling current exceeds a second current threshold, opening the switch of the freewheeling circuit to deactivate freewheeling.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of 'a', 'an', and 'the' include plural referents unless the context clearly dictates otherwise.

BRIEF DESCRIPTION OF THE DRAWINGS

Various objects and advantages and a more complete understanding of the present disclosure are apparent and more readily appreciated by referring to the following detailed description and to the appended claims when taken in conjunction with the accompanying drawings:

DETAILED DESCRIPTION

Figure 1A:
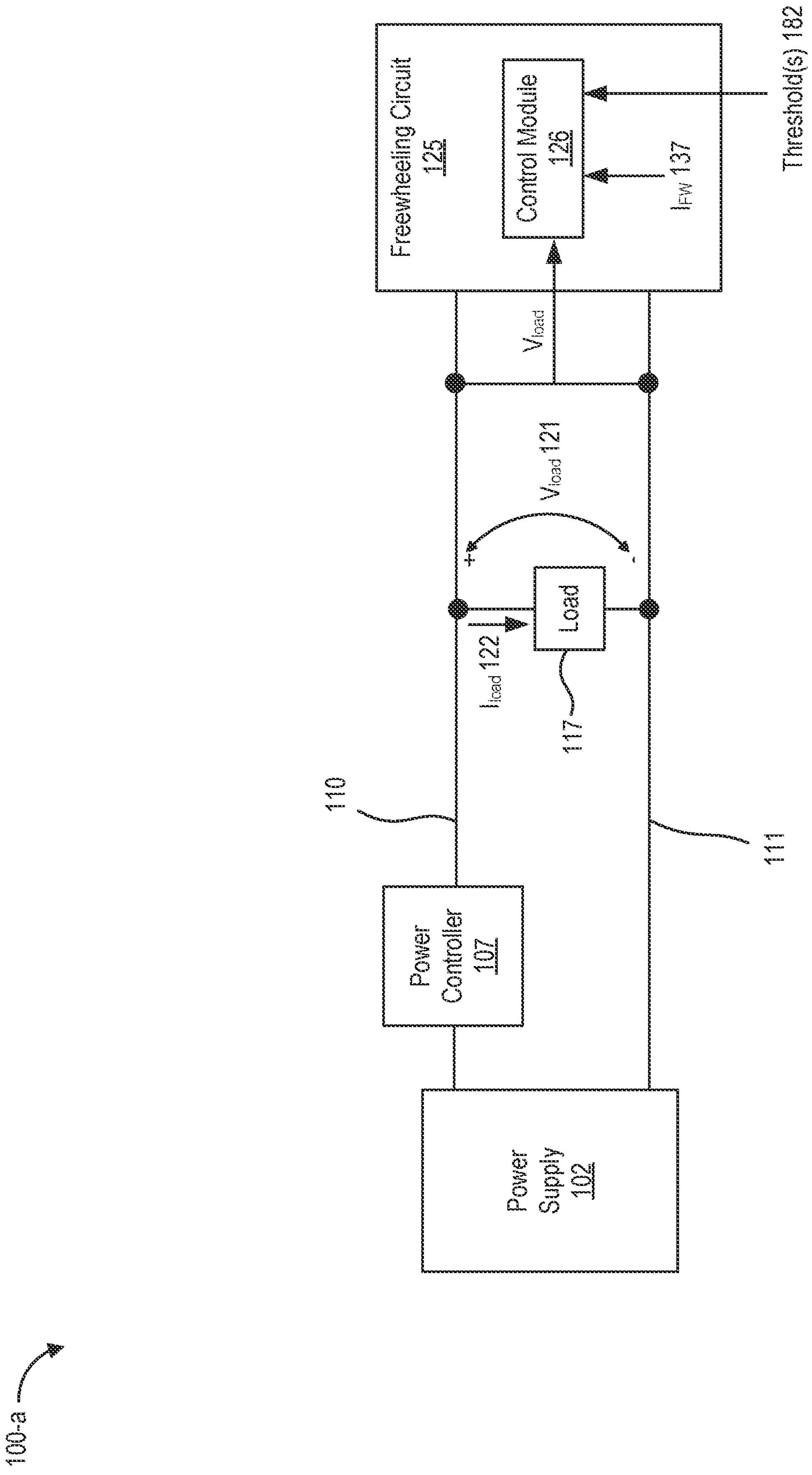
FIG. 1A illustrates a block diagram of a power system having a freewheeling circuit, where the freewheeling circuit is directed coupled to an inductive load, according to various aspects of the disclosure.

Prior to describing the embodiments in detail, it is expedient to define certain terms as used in this disclosure.

The word "exemplary" is used herein to mean "serving as an example, instance, or illustration." Any embodiment described herein as "exemplary" is not necessarily to be construed as preferred or advantageous over other embodiments.

Preliminary note: the flowcharts and block diagrams in the following Figures illustrate the functionality and operation of possible implementations of a power system having a freewheeling circuit for preventing overvoltage conditions at a load (e.g., an inductive load), according to various embodiments of the present disclosure. In some instances, the freewheeling circuit may comprise one or more of a switch controller, one or more switches, and/or a comparator, in accordance with one or more implementations. It should be noted that, in some alternative implementations, the functions noted in each block may occur out of the order noted in the figures. For example, two blocks shown in succession may, in fact, be executed substantially concurrently, or the blocks may sometimes be executed in the reverse order, depending upon the functionality involved.

As used herein, the terms "power supply", "power source", and "AC source" may be used interchangeably throughout the disclosure.

As used herein, the terms "controller" and "control module" may be used interchangeably throughout the disclosure.

Furthermore, as used herein, the term "power controller" may refer to a power controller connected between a power source (e.g., alternating current or AC power source) and a load (e.g., an inductive load), where the power controller may or may not include a freewheeling circuit. That is, in some instances, the freewheeling circuit may be implemented within the power controller of the power system. In other cases, the freewheeling circuit can be directly coupled across the inductive load of the power system. In some cases, the freewheeling circuit can include a switch controller or control module that is configured to control a freewheeling state, where controlling the freewheeling state comprises activating/enabling freewheeling or deactivating/disabling freewheeling. In some cases, activating or enabling freewheeling comprises closing a switch in the freewheeling circuit to provide a path for the current in the inductive load to decay. Additionally, deactivating or disabling freewheeling comprises opening a switch in the freewheeling circuit.

As used herein, the current threshold terms "$I_{max}$" and "$I_{load\_max}$" may be used interchangeably throughout the disclosure, and may be used to refer to the maximum, positive load current during the positive AC cycle.

As used herein, the current threshold terms "$I_{short\_max}$" and "$I_{FW\_short\_max}$" may be used interchangeably throughout the disclosure, and may correspond to the maximum, positive short circuit current of the freewheeling circuit during the positive AC cycle.

As used herein, the current threshold terms "$I_{min}$" and "$I_{load\_min}$" may be used interchangeably throughout the disclosure, and may be used to refer to the minimum, negative load current during the negative AC cycle.

As used herein, the term "$I_{short\_min}$" and "$I_{FW\_short\_min}$" may be used interchangeably throughout the disclosure, and may correspond to the minimum, negative short circuit current of the freewheeling circuit during the negative AC cycle.

Lastly, as used herein the terms "$I_{short}$" and "$I_{PC\_short}$" may be used interchangeably throughout the disclosure and may correspond to a current parameter of the power controller (PC). Specifically, but without limitation, $I_{short}$ (or $I_{PC\_short}$) may refer to the maximum current that can be provided by the power controller.

Turning now to FIG. 1A, which illustrates an example of a power system 100-*a* configured for preventing overvoltage conditions at an output load, according to various aspects of the disclosure. As seen, the power system 100-*a* comprises a power supply 102, a load 117, a power controller 107 coupled between the power supply 102 and the load 117, and a freewheeling circuit 125 coupled to the load 117. The power system 100-*a* can also include two power rails 110 and 111, where power rail 110 may be associated with a higher voltage level than the power rail 111. In this example, $V_{load}$ 121 corresponds to the load voltage across the inductive load 117, while $I_{load}$ 122 corresponds to the current flowing through the inductive load 117.

Figure 7:
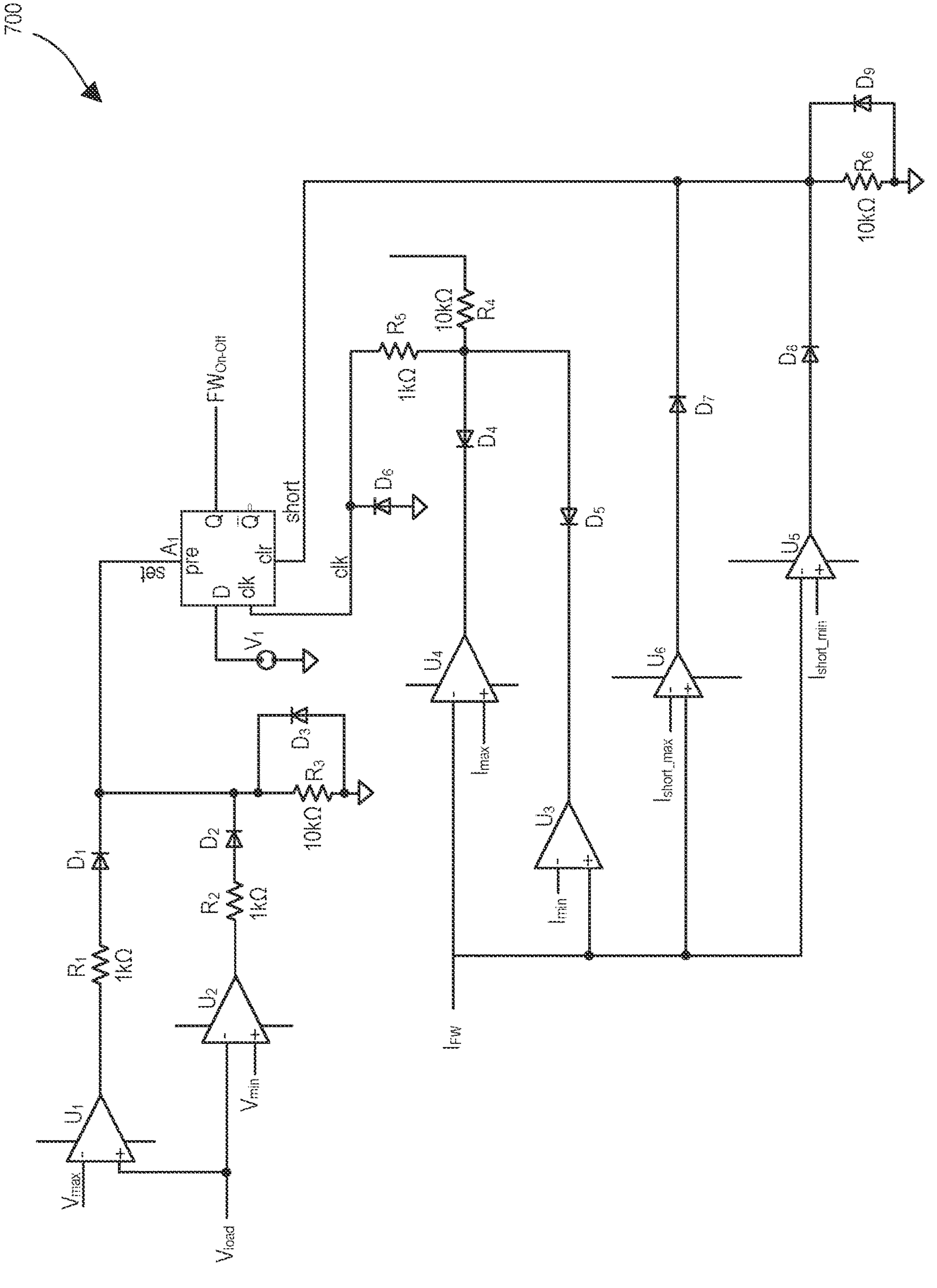
FIG. 7 illustrates an example of a logic circuit that can be implemented within any of the switch controllers and/or freewheeling circuits described with reference to FIGS. 1-3D, according to various aspects of the disclosure.

In some examples, the freewheeling circuit 125 includes a switch controller 126 (or control module 126), where the control module is configured to monitor a load voltage 121 (or $V_{load}$ 121) and a freewheeling current 137 (or $I_{FW}$ 137). The control module 126 is further configured to receive an indication of one or more threshold(s) 182, where the threshold(s) 182 may include one or more voltage thresholds (VTH) and/or one or more current thresholds ($I_{TH}$). In some embodiments, the control module 126 is configured to control a state of the freewheeling circuit 125, based at least in part on one or more of comparing $V_{load}$ 121 to VTH and comparing $I_{FW}$ 137 to $I_{TH}$. Some non-limiting examples of voltage and current thresholds are shown in FIG. 7, such as, but not limited to $V_{max}$, $V_{min}$, $I_{max}$, $I_{min}$, $I_{short\_max}$, and $I_{short\_min}$. As described below with reference to FIG. 7, $V_{max}$ may correspond to the voltage value used to trigger the start of freewheeling during the positive part of the cycle, e.g., enable freewheeling if $V_{load}>V_{max}$. Similarly, $V_{min}$ may equal negative $V_{max}$, and $V_{min}$ may correspond to the voltage value used to trigger the start of freewheeling during the negative portion of the cycle, e.g., enable freewheeling if $V_{load}<V_{min}$. Furthermore, in FIG. 7, $I_{max}$ is the current threshold value used to trigger the end of freewheeling, e.g., disable or end freewheeling if $I_{FW}<I_{max}$. Additionally, or alternatively, $I_{FW}$ can also be compared to $I_{short\_max}$, and freewheeling can be disabled upon detecting that $I_{FW}>I_{short\_max}$.

Figure 1B:
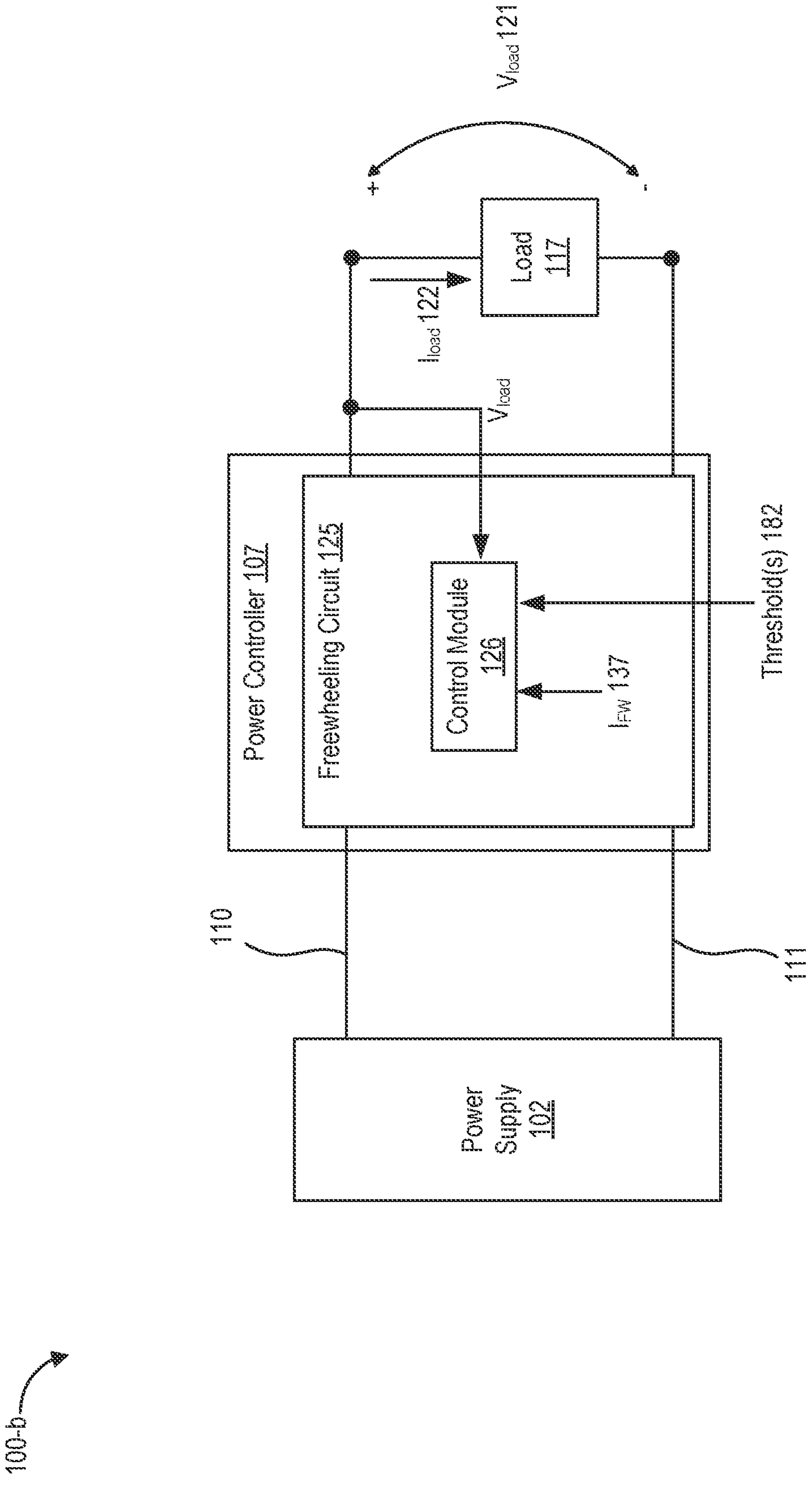
FIG. 1B illustrates a block diagram of another power system having a freewheeling circuit, where the freewheeling circuit is integrated with a power controller, according to various aspects of the disclosure.

FIG. 1B illustrates another example of a power system 100-*b* configured for preventing overvoltage conditions at an output load, according to various aspects of the disclosure. The power system 100-*b* may implement one or more aspects of the power system 100-*a* described with reference to FIG. 1A and/or any of the other power systems described herein. In some examples, the freewheeling circuit 125 need not be coupled to the output of the load 117. Instead, the freewheeling circuit 125 can be implemented within the power controller 107, as shown in FIG. 1B.

Figure 2:
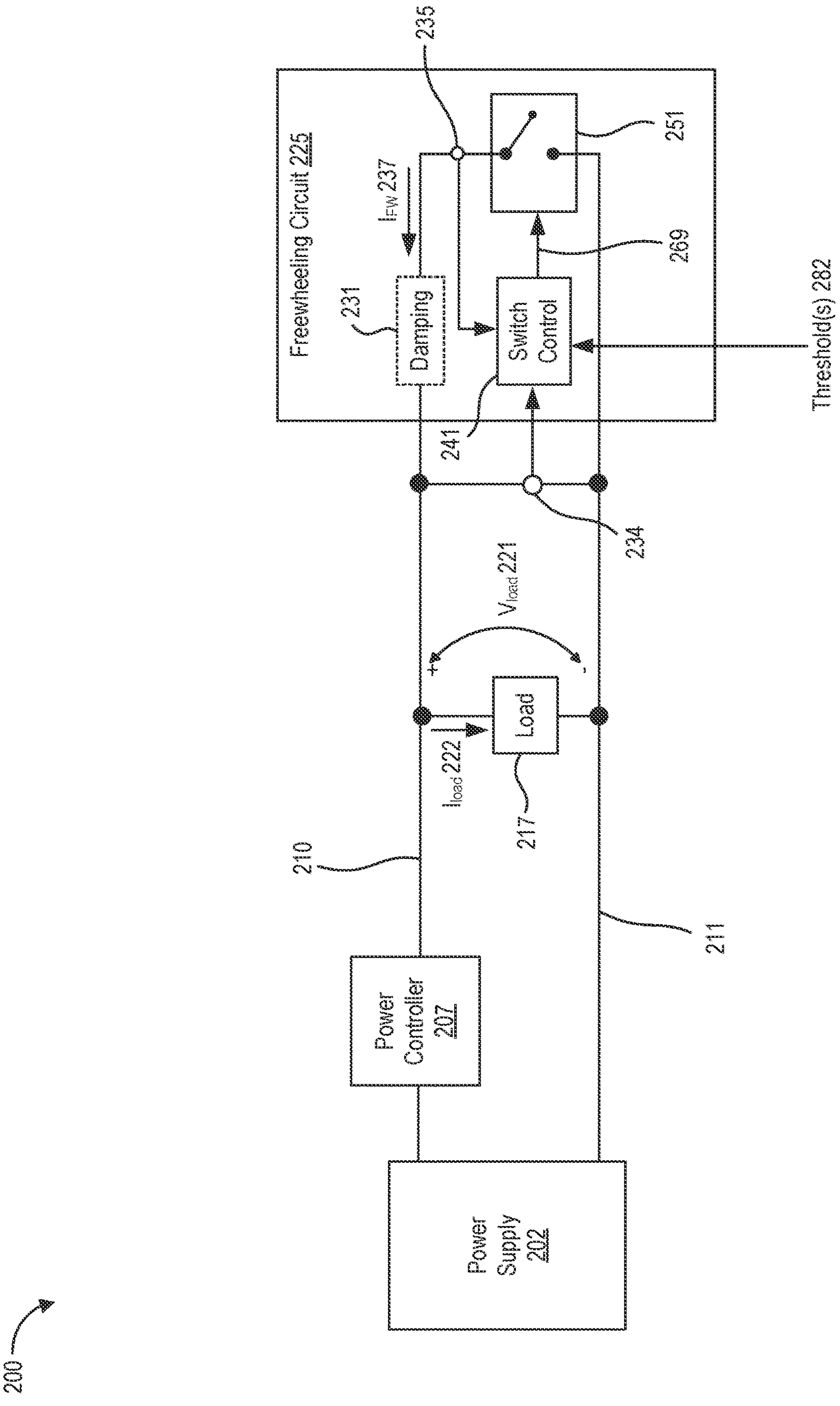
FIG. 2 illustrates a schematic diagram of a power system having a freewheeling circuit, according to various aspects of the disclosure.

FIG. 2 illustrates an example of a power system 200 configured for preventing overvoltage conditions at an output load, according to various aspects of the disclosure. The power system 100-*b* may implement one or more aspects of the power systems 100-*a* and/or 100-*b* described with reference to FIGS. 1A and/or 1B, respectively, and/or any of the other power systems described herein.

The power system 200 comprises a power supply 202, such as an AC power supply or a pulsed power supply. The power supply 202 is configured to be coupled to a load 217, and a power controller 207 may be coupled between the power supply 202 and the load 217. The load 217 may be an inductive load. As seen in FIG. 2, the power system 200 may comprise a first power rail 210 and a second power rail 211, where the first and the second power rails may be associated with different voltages. In one non-limiting example, the power rail 210 may be associated with a higher voltage level than the second power rail 211. In some cases, the second power rail 211 may be connected to ground. The power supply 202 can generate a maximum positive voltage ($V_{max}$), where $V_{max}$ may be equal or substantially equal to the positive mains voltage ($V_{main}$). If the power supply 202 is an AC power source, $V_{min}=-V_{max}$. In some examples, the power controller 207 can include at least one controllable switch. Controlling the switch of the power controller 207 enables the power supply 202 to be connected or disconnected from the load 217.

In some examples, the load 217 may be an inductive load. In such cases, when the switch of the power controller 207 is closed, the power supply 202 is connected to the load 217 and the load voltage 221 (or $V_{load}$ 221) generated across the load 217 is equal to or lower than $V_{max}$ and/or $V_{main}$ s. Furthermore, $I_{load}$ 222 corresponds to the current that flows through the inductive load 217. In some circumstances, the power controller 207 may be turned OFF and/or the switch in the power controller 207 may be opened while the inductive load 217 is charged. In such cases, the $V_{load}$ 221 across the load 217 may rise above $V_{max}$ and/or $V_{main}$ s, leading to overvoltage conditions in the power system 200. Such overvoltage conditions can not only damage the components (e.g., switches, diodes, etc.) of the power system 200, but may also pose a safety hazard to user(s) of the system 200. To mitigate against such issues, aspects of the present disclosure are directed to a freewheeling technique that prevents such overvoltage conditions from occurring. Specifically, but without limitation, the freewheeling circuit 225 provides a path for the current ($I_{load}$ 222) in the inductive load 217 to decay, for instance, when the switch in the power controller 207 is opened. This can help reduce $V_{load}$ 221 to a level below the maximum operating voltage of the various components of the power system 200, thereby preventing them from overheating and/or getting damaged.

As seen, the freewheeling circuit 225 comprises a switch controller 241, a switch 251, and electrical damping 231. The switch controller 241 is configured to monitor a freewheeling current ($I_{FW}$) 237 in the freewheeling circuit 225 and $V_{load}$ 221. In this example, the switch controller monitors $I_{FW}$ 237 at node 235 and $V_{load}$ 221 at node 234. The switch controller 241 is further configured to receive a plurality of inputs, where the plurality of inputs can include one or more threshold(s) 282. In some examples, the threshold(s) 282 may include one or more voltage thresholds and one or more current thresholds. Additionally, or alternatively, the threshold(s) 282 may be used to define upper and lower voltage margins and/or upper and lower current margins. The voltage margins may be used to determine whether freewheeling is needed. In some cases, the power supply 202 comprises an AC power source, in which case the voltage margins are selected based on the positive and negative values of the AC voltage, respectively. For example, the upper voltage margin (or upper voltage threshold) may be equal or substantially equal to the positive mains voltage ($V_{main}$) of the power supply 202, while the lower voltage margin (or lower voltage threshold) may be approximately equal to the negative mains voltage ($-V_{main}$). In other cases, the upper voltage margin (e.g., $V_{max}$) may be based on the $V_{main}$ and a factor 'f', where 'f'>1. For example, if the factor 'f'=1.1, $V_{max}$=1.1*$V_{main}$. In this example, the lower voltage margin (e.g., $V_{min}$) may then be defined as follows: $V_{min}$=−1.1*$V_{main}$.

In a similar regard, the upper current margin or threshold may be equal or substantially equal to the maximum current ($I_{max}$) that can flow through the load, where $I_{max}$=maximum $I_{load}$ 222. Alternatively, the upper current margin or threshold may correspond to the short circuit current ($I_{short}$) of the power controller 207, i.e., the current when the switch in the power controller 207 is closed. In some cases, the upper current margin or threshold may be limited by the inductive load 217. In some embodiments, the lower current margin/threshold may be 0 amps. In other cases, the lower current margin/threshold may be selected based on the upper voltage margin (e.g., $V_{max}$, $V_{mains}$), further described below. In some embodiments, the value of $I_{max}$ (e.g., shown in FIG. 7) may be low enough to help keep the rising load voltage, $V_{load}$, below $V_{max}$ after freewheeling has been turned off. This helps reduce or minimize high frequency oscillations resulting from switching the freewheeling state, i.e., enabling or disabling freewheeling.

In some cases, the switch controller 241 is configured to monitor $V_{load}$ 221 and compare it to at least one voltage threshold to determine a freewheeling state. Additionally, or alternatively, the switch controller 241 is configured to monitor $I_{FW}$ 237 and compare it to at least one current threshold to determine a freewheeling state. In some cases, the freewheeling state can be controlled by controlling the open/close position of the switch 251, e.g., using control signal 269. For example, the switch controller 241 can activate freewheeling by closing the switch 251, e.g., in response to determining that $V_{load}$ 222 exceeds a voltage threshold (e.g., $V_{mains}$ and/or $V_{max}$). In some cases, when the switch of the power controller 207 is opened, $V_{load}$ 221 may exceed the maximum operating voltage of the power supply 202. As an example, if the RMS value $V_{load}$ exceeds a desired or target value, the power controller 207 may open its switch to limit $V_{load}$. Without a freewheeling path, however, $V_{load}$ may rise above $V_{mains}$ when the power controller's switch is opened. In such cases, without a path for the current to decay, the energy stored in the inductive load 217 can cause $V_{load}$ 217 to rise above the mains or maximum voltage. By closing the switch 251, the energy stored in the inductive load 217 can decay as current flows through the electrical damping 231 (e.g., a resistor). The electrical damping 231 can also help influence the decay and/or the freewheeling current ($I_{FW}$) during a short circuit condition.

Likewise, in some circumstances, the switch controller 241 can deactivate or disable freewheeling by opening the switch 251, e.g., in response to determining that $I_{FW}$ 237 goes below a lower current margin/threshold. For example, during a positive portion of the AC cycle, freewheeling is turned OFF if $I_{FW}$ 237<$I_{max}$. Similarly, during a negative portion of the AC cycle, freewheeling is turned OFF if $I_{FW}$ 237>$I_{min}$. In some examples, the lower current margin/threshold may be low enough to help ensure that $V_{load}$ 221 remains below the upper voltage threshold (e.g., $V_{mains}$ or $V_{max}$) when the switch 251 is opened to disable freewheeling.

Figure 8:
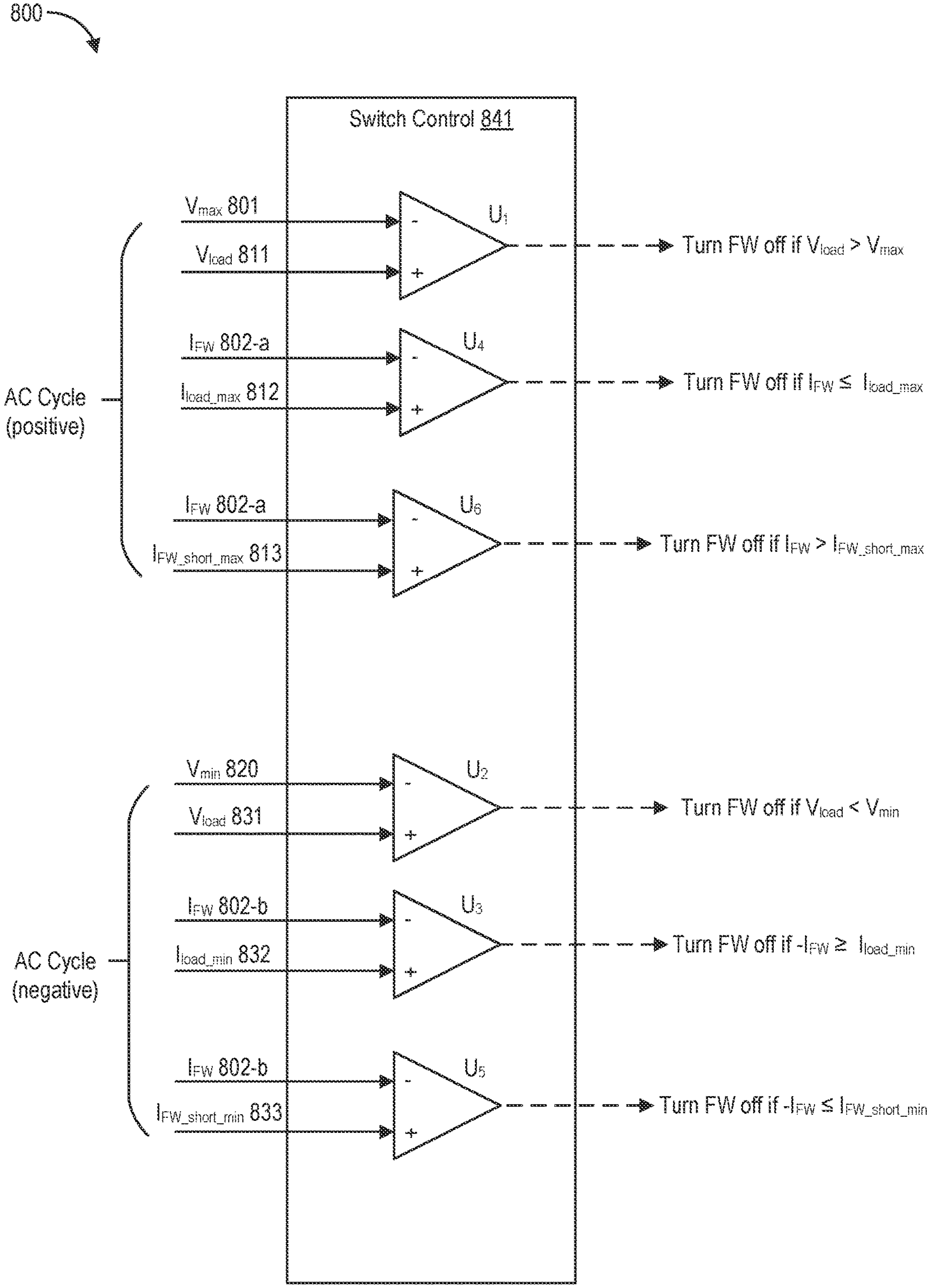
FIG. 8 illustrates another example of a logic circuit that can be implemented within any of the switch controllers and/or freewheeling circuits described with reference to FIGS. 1-3D and/or 7, according to various aspects of the disclosure.

In some embodiments, the switch controller 241 may also open the switch 251, e.g., using control signal 269, based on detecting that $I_{FW}$ 237 exceeds an upper current margin/threshold (e.g., $I_{short\_max}$ in FIG. 7, $I_{FW\_short\_max}$ in FIG. 8). In some cases, $I_{FW}$ 237 may exceed $I_{short\_max}$ when the power controller 207 (or the switch in the power controller) is closed or turned ON while freewheeling is still active. In such cases, freewheeling may need to be deactivated or disabled to prevent a short circuit in the power system 200. In some instances, $I_{short\_max}$ corresponds to the current value used to force the end of freewheeling, e.g., disable or end freewheeling if $I_{FW}$>$I_{short\_max}$, which may result due to a short circuit condition when the load is driven, and freewheeling is active.

In some cases, the electrical damping or resistance 231 in the freewheeling circuit 225 may be selected based on use case, operating voltage of power supply 202, inductance of the load 217, or any other applicable attributes of the power system 200. In some cases, the electrical damping 231 may comprise a variable resistor or a potentiometer, which allows a user to adjust the resistance/damping of the freewheeling circuit 225. In some embodiments, the resistance value of the electrical damping 231 may be selected to ensure that $I_{FW}$ 237 remains below $I_{short}$, for instance, when the power controller 207 is turned ON while freewheeling is still active (i.e., switch 251 is in a closed position).

As used herein, the term/variable "$I_{short}$" may refer to a parameter of the power controller (e.g., power controllers 107, 207, and/or 307). Specifically, the current, $I_{short}$, refers to the maximum current that can be provided by the power controller. Furthermore, the current, $I_{load}$, such as $I_{load}$ 222, refers to the current that flows through the load 217. When fully powered, $I_{max}$ refers to the maximum current of the load 217. In other words, when fully powered or turned on, $I_{max}$=$I_{load}$ 222.

As used herein, the term/variable "$I_{short\_max}$" or "$I_{short\_pos}$" may refer to a parameter of the freewheeling circuit 225. Typically, the magnitude of $I_{short\_max}$ may be smaller than $I_{short}$, which allows detection of a short circuit condition before the current in the power controller 207 reaches $I_{short}$. In some cases, the power supply 202 comprises an AC power source, in which case $I_{short\_min}$ refers to the negative counterpart of $I_{short\_max}$, i.e., $I_{short\_min}$=−$I_{short\_max}$.

It should be noted that the freewheeling circuit 225 can be utilized with both AC and DC power supplies. In terms of performance, the disclosed freewheeling circuit 225 may be comparable to the use of a diode (e.g., in parallel to the load) in DC systems. However, in contrast to a freewheeling diode, the freewheeling circuit 225 can also be utilized with AC power supplies. In this way, the present disclosure can help provide a more robust and flexible technique for preventing overvoltage conditions in power systems having an inductive load, as compared to the prior art.

Figure 3A:
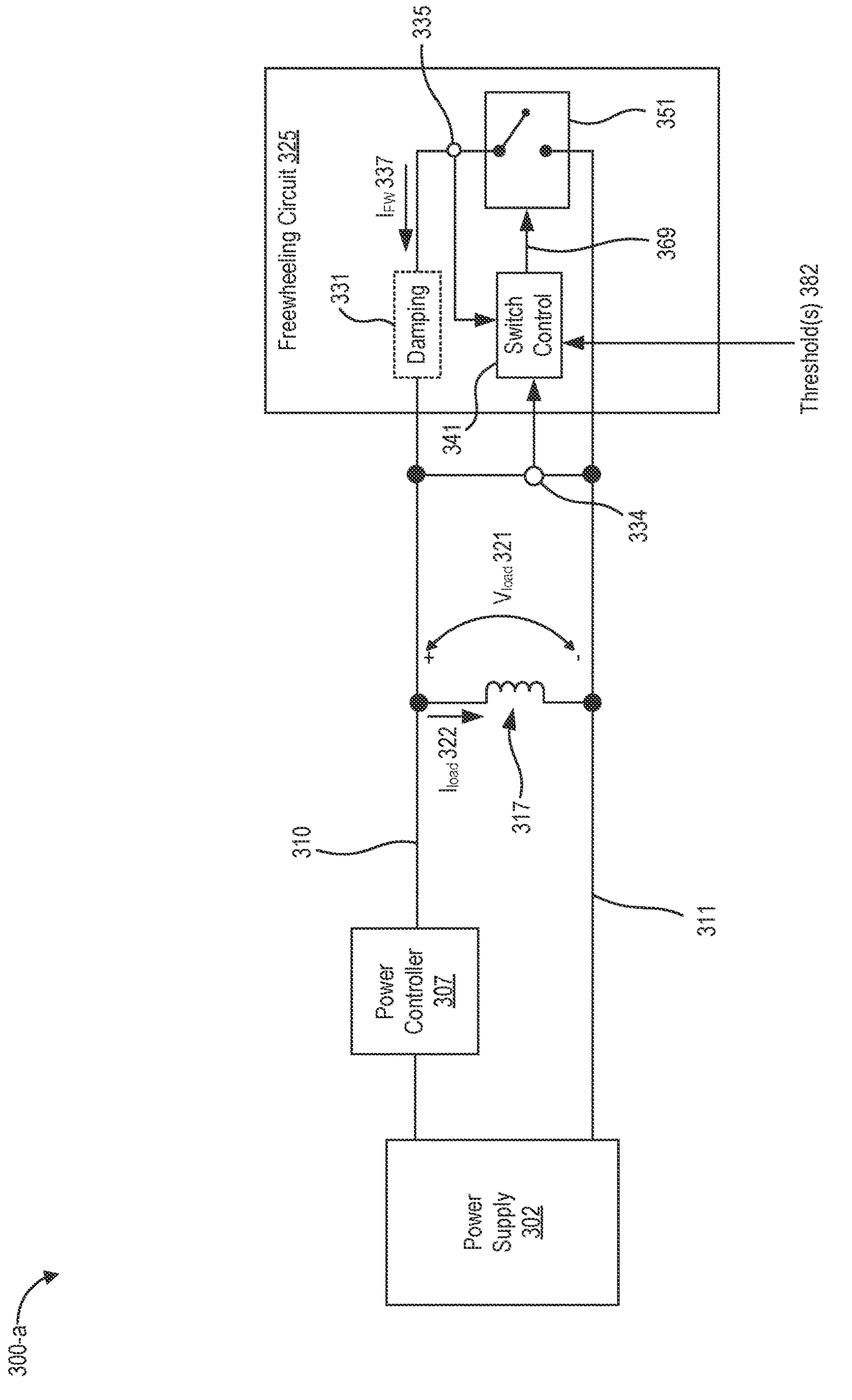
FIG. 3A illustrates a schematic diagram of a power system having an inductive load and a freewheeling circuit coupled to the inductive load, according to various aspects of the disclosure.

FIG. 3A illustrates an example of a power system 300-*a* configured for preventing overvoltage conditions at an output load, such as an inductive load 317, according to various aspects of the disclosure. The power system 300-*a* may implement one or more aspects of the power systems 100 (e.g., 100-*a*, 100-*b*) and/or 200 described with reference to FIGS. 1A, 1B, and/or 2.

The power system 300-*a* comprises a power supply 302, such as an AC power supply or a pulsed power supply. The power supply 302 is configured to be coupled to the inductive load 317 using a first power rail 310 and a second power rail 311, where the first power rail 310 and the second power rail 311 may be associated with different voltages. In some examples, a power controller 307 may be coupled between the power supply 302 and the inductive load 317. The power supply 302 generates a voltage across the inductive load, shown as $V_{load}$ 321. Additionally, $I_{load}$ 322 corresponds to the current that flows through the inductive load 317.

The power supply 302 can generate a maximum voltage ($V_{max}$), where $V_{max}$ may be equal or substantially equal to the mains voltage ($V_{main}$). In some examples, the power controller 307 can include at least one controllable switch. Controlling the switch of the power controller 307 enables the power supply 302 to be connected or disconnected from the inductive load 317.

In some examples, when the switch of the power controller 307 is closed, the power supply 302 is connected to the load 317 and the load voltage 321 (or $V_{load}$ 321) generated across the load 317 is equal to or lower than $V_{max}$ and/or $V_{main}$ s. In some circumstances, the power controller 307 may be turned OFF and/or the switch in the power controller 307 may be opened while the inductive load 317 is charged. In such cases, the $V_{load}$ 321 across the load 317 may rise above $V_{max}$ and/or $V_{main}$ s, leading to overvoltage conditions in the power system 300-*a*. Besides damaging the components (e.g., switches, diodes, etc.) of the power system 300-*a*, such overvoltage conditions can also pose a safety hazard to user(s) of the system 300-*a*. To mitigate against such issues, aspects of the present disclosure are directed to a freewheeling technique that can help prevent such overvoltage conditions from occurring.

Figure 3B:
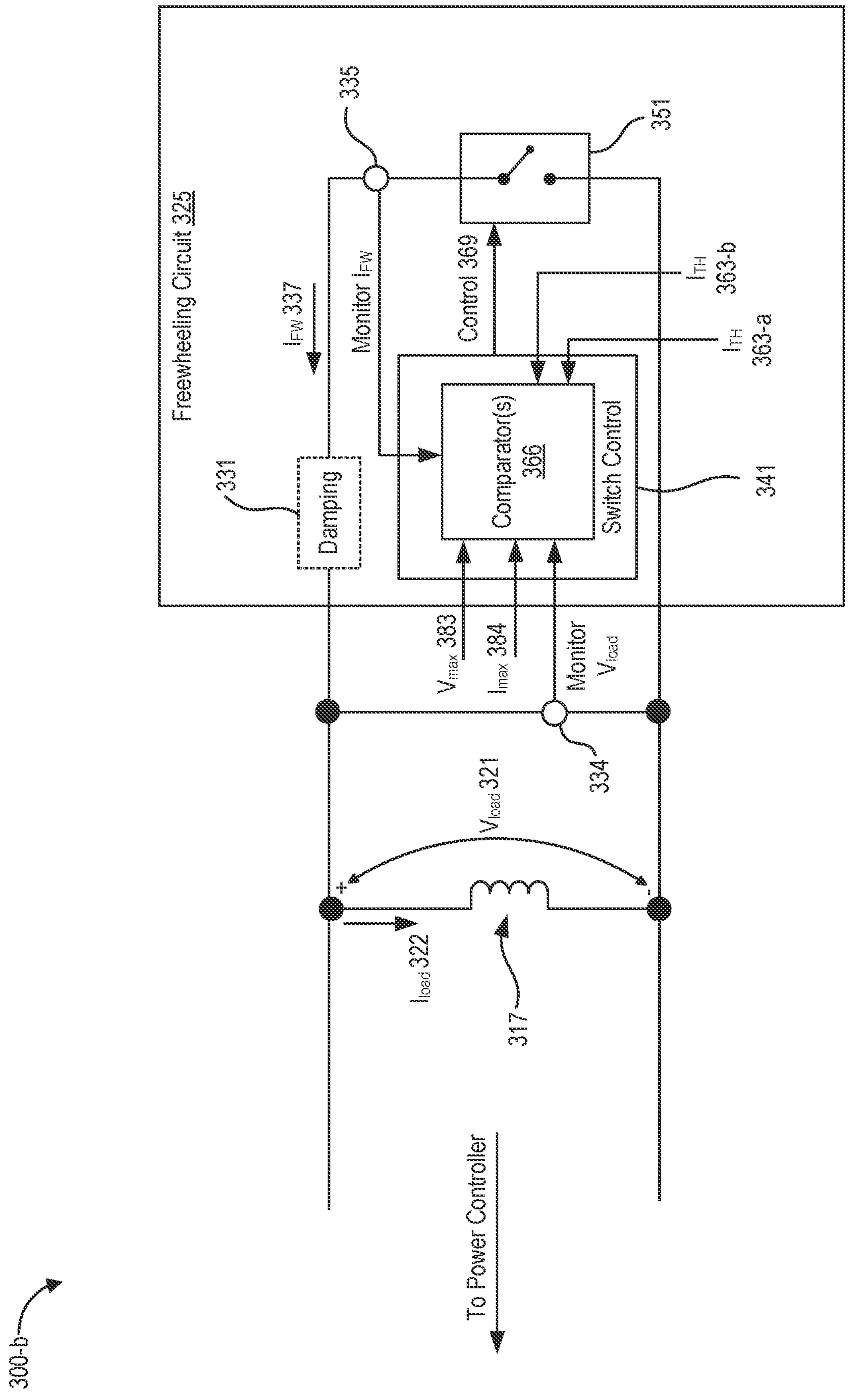
FIG. 3B illustrates a detailed schematic diagram of the freewheeling circuit in any of FIGS. 1-3A, according to various aspects of the disclosure.

In some embodiments, a freewheeling circuit 325 can be coupled across the inductive load 317, as shown in FIGS. 3A-B. The freewheeling circuit 325 provides a path for the current in the inductive load 317 to decay, for instance, when the switch in the power controller 307 is opened. This can help reduce $V_{load}$ 321 to a voltage level that is below the maximum operating voltage of the various components of the power system 300-*a*, thereby preventing them from overheating and/or getting damaged.

As seen, the freewheeling circuit 325 comprises a switch controller 341, a switch 351, and electrical damping 331. The switch controller 341 is configured to monitor a freewheeling current ($I_{FW}$) 337 in the freewheeling circuit 325 and $V_{load}$ 321. In this example, the switch controller monitors $I_{FW}$ 337 at node 335 and $V_{load}$ 321 at node 334. The switch controller 341 is further configured to receive a plurality of inputs, where the plurality of inputs can include one or more threshold(s) 382. In some examples, the threshold(s) 382 may include one or more voltage thresholds and one or more current thresholds. Additionally, or alternatively, the threshold(s) 382 may be used to define upper and lower voltage margins and/or upper and lower current margins. For example, the upper voltage margin (or upper voltage threshold) may be equal or substantially equal to the positive mains voltage (V main) of the power supply 202, while the lower voltage margin (or lower voltage threshold) may be approximately equal to the negative mains voltage ($-V_{main}$). In other cases, the upper voltage margin (e.g., $V_{max}$) may be defined as follows: $V_{max}=f*V_{main}$. Additionally, the lower voltage margin (e.g., $V_{min}$) may be defined as follows: $V_{min}=-f*V_{main}$. In some cases, f>1, for instance, f=1.1, 1.2, 1.5, to name a few non-limiting examples. Similarly, the upper current margin or threshold may be equal or substantially equal to the maximum current ($I_{max}$) that can flow through the load. Alternatively, the upper current margin or threshold may correspond to the short circuit current of the power controller 307, i.e., the current when the switch in the power controller 307 is closed. In some cases, the upper current margin or threshold may be limited by the inductive load 317. In some embodiments, the lower current margin/threshold may be 0 amps. In other cases, the lower current margin/threshold may be selected based on the upper voltage margin (e.g., $V_{max}$, $V_{main}$ s), further described below.

In some cases, the switch controller 341 is configured to monitor $V_{load}$ 321 and compare it to at least one voltage threshold to determine a freewheeling state. Additionally, or alternatively, the switch controller 341 is configured to monitor $I_{FW}$ 337 and compare it to at least one current threshold to determine a freewheeling state. In some cases, the freewheeling state can be controlled by controlling the open/close position of the switch 351, e.g., using control signal 369. For example, the switch controller 341 can activate freewheeling by closing the switch 351, e.g., in response to determining that $V_{load}$ exceeds a voltage threshold (e.g., $V_{mains}$ and/or $V_{max}$). In some cases, when the power controller opens its switch, the voltage (i.e., $V_{load}$ 321) over the now disconnected load can rise above the maximum operating voltage of the power supply 302. In such cases, without a path for the current ($I_{load}$ 322) to decay, the energy stored in the inductive load 317 can cause $V_{load}$ 317 to rise above the mains or maximum voltage. By closing the switch 351, the energy stored in the inductive load 317 can decay as current flows through the electrical damping 331 (e.g., a resistor). As noted above, the electrical damping 331 can also help influence the decay and/or the freewheeling current ($I_{FW}$) during a short circuit condition.

Likewise, in some circumstances, the switch controller 341 can deactivate freewheeling by opening the switch 351, e.g., in response to determining that $I_{FW}$ 337 goes below a lower current margin/threshold. In some examples, the lower current margin/threshold may be low enough to help ensure that $V_{load}$ 321 remains below the upper voltage threshold (e.g., $V_{mains}$ or $V_{max}$) when the switch 351 is opened to deactivate freewheeling. For example, in relation to FIG. 7, if the comparator $U_4$ (or flip-flop $U_4$) detects that $I_{FW}<I_{max}$, A1 is used turned OFF freewheeling (FW). In this case, the lower current margin/threshold is $I_{max}$. Similarly, during the negative portion of the AC cycle, if the comparator $U_3$ detects that $-I_{FW}>I_{min}$, A1 turns OFF freewheeling.

In some embodiments, the switch controller 341 may also open the switch 351, e.g., using control signal 369, based on detecting that $I_{FW}$ 337 exceeds an upper current margin/threshold (e.g., $I_{short\_max}$). In some cases, $I_{FW}$ 337 may exceed $I_{max}$ when the power controller 307 (or the switch in the power controller) is closed or turned ON while freewheeling is still active. In such cases, freewheeling may need to be deactivated/disabled to prevent a short circuit in the power system 300.

In some cases, the electrical damping or resistance 331 in the freewheeling circuit 325 may be selected based on use case, operating voltage of power supply 302, inductance of the load 317, or any other applicable attributes of the power system 300. In some cases, the electrical damping 331 may comprise a variable resistor or a potentiometer, which allows a user to dynamically adjust the resistance/damping of the freewheeling circuit 325. In some embodiments, the resistance value of the electrical damping 331 may be selected to ensure that $I_{FW}$ 337 remains below $I_{short}$, for instance, when the power controller 307 is turned ON while freewheeling is still active (i.e., switch 351 is in a closed position).

As noted above, the term/variable "$I_{short}$" may refer to a parameter of the power controller (e.g., power controllers 107, 207, and/or 307). Specifically, the current, $I_{short}$, refers to the maximum current that can be provided by the power controller. Furthermore, the current, $I_{load}$, such as $I_{load}$ 322, refers to the current that flows through the inductive load 317. When fully powered, $I_{max}$ refers to the maximum current of the load 317. In other words, when fully powered or turned on, $I_{max}=I_{load}$ 322.

As used herein, the term/variable "$I_{short\_max}$" or "$I_{short\_pos}$" may refer to a parameter of the freewheeling circuit 325. Typically, the magnitude of $I_{short\_max}$ (also referred to as $I_{FW\_short\_max}$) may be smaller than $I_{short}$ (also referred to as $I_{PC\_short}$), which allows detection of a short circuit condition before the current in the power controller 307 reaches $I_{short}$. In some cases, the power supply 302 comprises an AC power source, in which case $I_{short\_min}$ refers to the negative counterpart of $I_{short\_max}$, i.e., $I_{short\_min}=-I_{short\_max}$ It should be noted that the freewheeling circuit 325 can be utilized with both AC and DC power supplies. In terms of performance, the disclosed freewheeling circuit 325 may be comparable to the use of a diode (e.g., in parallel to the load) in DC systems. However, in contrast to a freewheeling diode, the freewheeling circuit 325 can also be utilized with AC power supplies. In this way, the present disclosure can help provide a more robust and flexible technique for preventing overvoltage conditions in power systems having an inductive load, as compared to the prior art.

In some embodiments, the switch controller 341 might also have an optional input (not shown) for control signals provided by the power controller 307 (or another external source), which can additionally serve to provide functionality of a controlled freewheeling system as seen in the prior art. In some aspects, such a design can provide "classical freewheeling" along with a "safety backup functionality" if these signals fail.

FIG. 3B illustrates a detailed view 300-*b* of the freewheeling circuit 325 described with reference to FIG. 3A, according to various aspects of the present disclosure. As seen in FIG. 3B, the freewheeling circuit 325 comprises the switch controller 341, where the switch controller 341 further includes at least one comparator 366 (also shown as comparators $U_1$ through $U_6$ in FIG. 7). The comparator 366 monitors the load voltage $V_{load}$ 321 across the inductive load 317 and the freewheeling current $I_{FW}$ 337 at nodes 334 and 335, respectively. The comparator 366 also receives an indication of a voltage threshold (e.g., $V_{max}$ 383) and/or a current threshold (e.g., $I_{max}$ 384, $I_{TH}$ 363-*a*, $I_{TH}$ 363-*b*). In some cases, the current thresholds $I_{TH}$ 363-*a* and $I_{TH}$ 363-*b* may be used to define current margins (i.e., a current range), where $I_{TH}$ 363-*a* may be greater than $I_{TH}$ 363-*b*. In one non-limiting example, the lower current margin $I_{TH}$ 363-*b* may be equal to 0 amps, while the upper current margin $I_{TH}$ 363-*a* may be equal or substantially equal to the maximum current ($I_{max}$ 384) that can flow through the inductive load 317, wherein $I_{max}$=maximum $I_{load}$ 322. Alternatively, the upper current margin $I_{TH}$ 363-*a* may correspond to the short circuit current, $I_{short}$, of the power controller (e.g., power controller 307 in FIG. 3A). In some cases, if the upper current margin or threshold $I_{TH}$ 363-*a* is $I_{max}$ (positive), the upper current threshold $I_{TH}$ 363-*a* may be limited by the inductive load 317. In yet other cases, the upper and lower current margins/thresholds may correspond to $I_{short\_max}$ and $I_{short\_min}$, respectively, described herein, including at least in reference to FIG. 7.

Figure 3C:
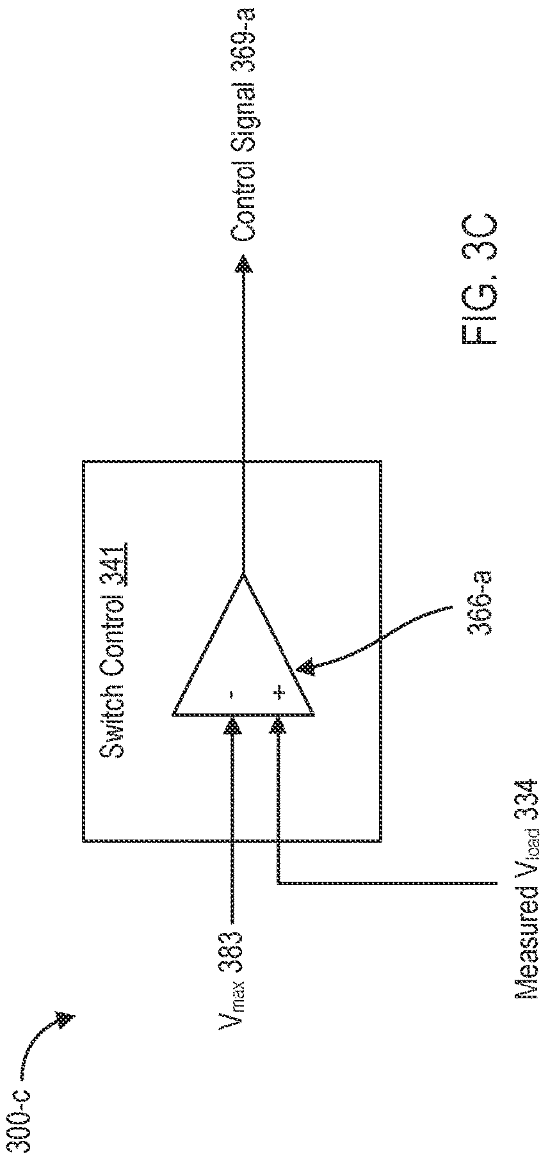
FIG. 3C illustrates an example of a switch controller comprising a comparator, where the switch controller can be utilized with any of the freewheeling circuits described with reference to FIGS. 1-3B, according to various aspects of the disclosure.

FIG. 3C illustrates an example 300-*c* of a switch controller comprising a comparator, where the switch controller can be utilized with any of the freewheeling circuits described with reference to FIGS. 1-3B, according to various aspects of the disclosure. As seen in FIG. 3C, a comparator 366-*a* of the switch controller 341 can measure a load voltage $V_{load}$ 334 across an inductive load (e.g., inductive load 317 in FIG. 3B) and compare it to a voltage threshold ($V_{max}$ 383) to determine a freewheeling state of the freewheeling circuit 325. For instance, the switch controller 341 can output a control signal 369-*a* to the switch 351 of the freewheeling circuit 325 to control the freewheeling state of the circuit 325. In some cases, the control signal 369-*a* can be used to close the switch 351 and enable freewheeling in response to detecting that $V_{load}$ exceeds $V_{max}$ 383. As noted above, activating or enabling freewheeling allows the energy stored in the inductive load 317 to decay as $I_{load}$ 322 flows through the switch 351 and damping 331. In other cases, the control signal 369-*a* can be used to open the switch 351 when the measured $V_{load}$ 334 is below the voltage threshold (e.g., $V_{max}$ and/or $V_{main}$ s), which deactivates or disables freewheeling.

Figure 5:
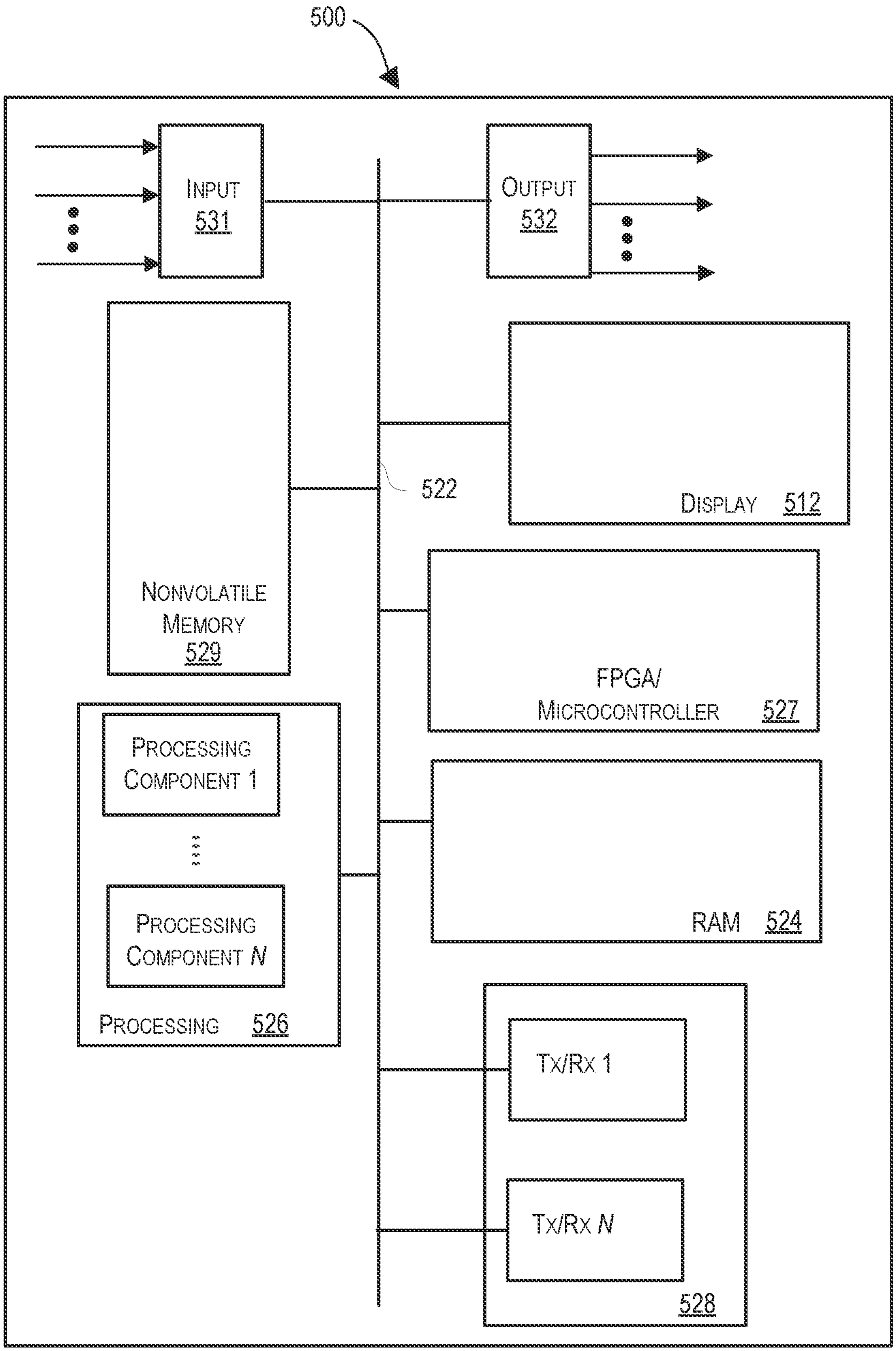
FIG. 5 illustrates a block diagram of a computer system that can be used to effectuate one or more aspects of the present disclosure.

In some embodiments, the switch controller 341 can be implemented using the computer system 500 described below with reference to FIG. 5. In such cases, the input component 531 may receive the measured $V_{load}$ and/or voltage threshold(s). Additionally, the output component 532 of the computer system 500 can transmit the control signal 369-*a*. In some examples, the computer system 500 may provide a means to configure and control the one or more threshold values used at the one or more comparators (e.g., comparators $U_1$ through $U_6$ seen in FIG. 7).

Figure 3D:
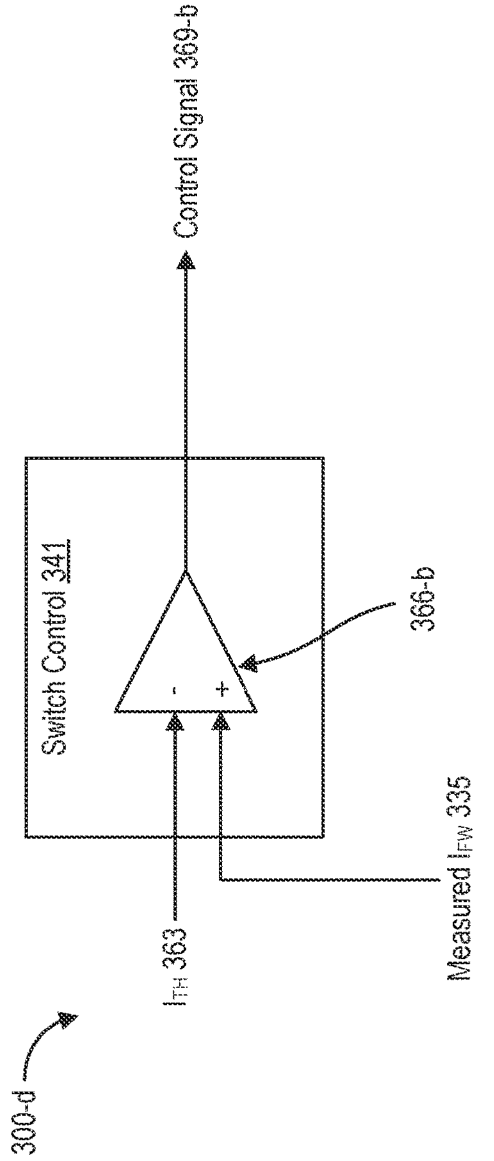
FIG. 3D illustrates another example of a switch controller comprising a comparator, where the switch controller can be utilized with any of the freewheeling circuits described with reference to FIGS. 1-3B, according to various aspects of the disclosure.

FIG. 3D illustrates an example 300-*d* of a switch controller 341 comprising a comparator, where the switch controller can be utilized with any of the freewheeling circuits described with reference to FIGS. 1-3B, according to various aspects of the disclosure.

The comparator 366-*b* may represent any of the current threshold comparators, such as comparators U3, U4, U5, and U6, described below with reference to FIG. 7. Furthermore, the threshold current, $I_{TH}$ 363, may represent either of the upper threshold current (e.g., $I_{TH}$ 363-*a* in FIG. 3B; $I_{max}$, which is the maximum value of $I_{load}$, where $I_{load}$ is the current flowing through the inductive load) or the lower threshold current (e.g., $I_{TH}$ 363-*b* in FIG. 3B; $I_{short}$ max, which is a parameter associated with the freewheeling circuit 325).

In some cases, each of the current threshold comparators in FIG. 7 can output its own output signal based on comparing $I_{FW}$ to the respective threshold input to the comparator. For instance, if $U_4$ detects that $I_{FW}<I_{max}$, freewheeling is turned OFF. Furthermore, if $U_6$ detects that $I_{FW}>I_{short\_max}$, freewheeling is turned OFF. Similarly, if $U_3$ detects that $-I_{FW}>I_{min}$, freewheeling is turned OFF. Additionally, if $U_5$ detects that $-I_{FW}<I_{short\_min}$, freewheeling is turned OFF. Additional details on the logic for enabling/disabling freewheeling based on comparing the two measured inputs (i.e., Vload, IFW) to the six thresholds (i.e., $V_{max}$, $I_{max}$, and $I_{short\_max}$ during positive AC input; $V_{min}$, $I_{min}$, and $I_{short\_min}$ during negative AC input) is described below with reference to FIGS. 7-8.

As seen in FIG. 3D, a comparator 366-*b* of the switch controller 341 can measure a freewheeling current ($I_{FW}$) 335 in the freewheeling circuit 325 and output a control signal 369-*b*, where the control signal 369-*b* is based at least in part on comparing the measured $I_{FW}$ 335 to a current threshold ($I_{TH}$) 363. In some aspects, the control signal 369-*b* is used to control the freewheeling state of the freewheeling circuit 325. For instance, the switch controller 341 can deactivate freewheeling by using the control signal 369-*b* to open the switch 351 of the freewheeling circuit 325, e.g., in response to detecting that $I_{FW}$ is below a current threshold (e.g., $I_{max}$, which corresponds to the maximum load current or $I_{load}$). In some examples, this current threshold may be low enough to help ensure that $V_{load}$ 321 remains below the upper voltage threshold (e.g., $V_{mains}$ or $V_{max}$) when the switch 351 is opened to deactivate freewheeling. In other cases, the switch controller 341 may also open the switch 351, e.g., using control signal 369-*b*, based on detecting that $I_{FW}$ exceeds an upper current margin/threshold (e.g., $I_{short\_max}$ in FIG. 7, $I_{FW\_short\_max}$ in FIG. 8). In some cases, $I_{FW}$ 337 may exceed $I_{short\_max}$ when the power controller 307 (or the switch in the power controller) is closed or turned ON while freewheeling is still active. In such cases, freewheeling may need to be deactivated to prevent a short circuit in the power system (e.g., power system 300-*a* or 300-*b*).

Figure 4:
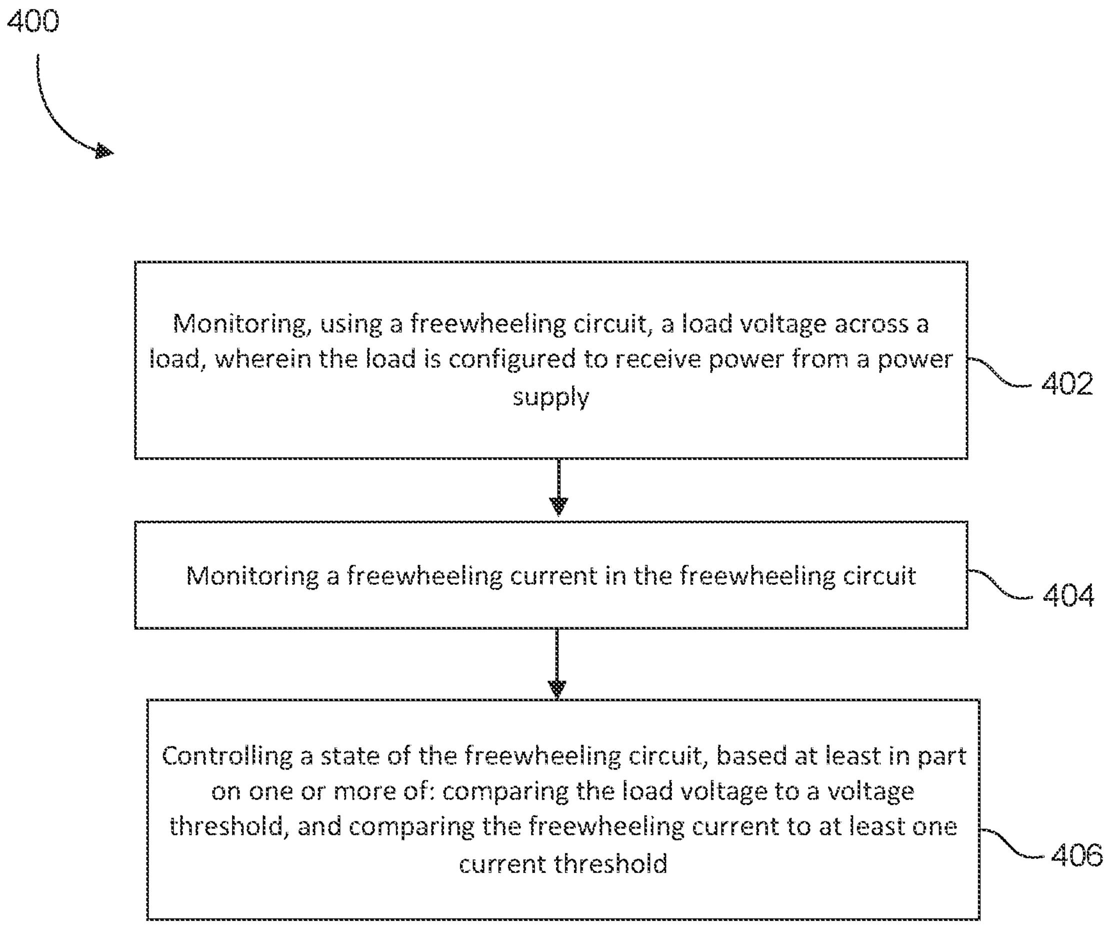
FIG. 4 illustrates an example of a method for preventing overvoltage conditions, according to various aspects of the present disclosure.

FIG. 4 illustrates an example of a method 400 for preventing overvoltage conditions, according to various aspects of the present disclosure.

A first operation 402 comprises monitoring, using a freewheeling circuit, a load voltage, $V_{load}$, across a load, wherein the load is configured to receive power from a power supply. In some embodiments, the load is an inductive load, and the power supply is an AC power supply. In other cases, the power supply may be an example of a pulsed power supply.

A second operation 404 comprises monitoring a freewheeling current, $I_{FW}$, in the freewheeling circuit. For example, as described with reference to FIGS. 3A-B, the switch controller 341 can monitor $I_{FW}$ 337 in the freewheeling circuit 325.

A third operation 406 comprises controlling a state of the freewheeling circuit, based at least in part on one or more of: comparing the load voltage, $V_{load}$, to a voltage threshold, and comparing the freewheeling current, $I_{FW}$, to at least one current threshold.

Turning now to FIG. 7, which illustrates an example of a logic circuit 700 that can be used to implement one or more aspects of the switch controller (or freewheeling controller), such as, but not limited to, control module 126, switch controller 241, and/or switch controller 341, according to various aspects of the present disclosure. As shown in FIG. 7, the logic circuit 700 may include one or more comparators (e.g., $U_1$, $U_2$, $U_3$, $U_4$, $U_5$, and/or $U_6$), which may be similar or substantially similar to the comparator(s) 366 described in relation to FIGS. 3A-D. Furthermore, it should be noted that $I_{FW}=I_{load}$ during freewheeling and as long as there is no short circuit condition. Additionally, as shown in FIG. 7, all the 'min' values, such as, $V_{min}$, $I_{min}$, and $I_{short}$ min are values used to cover the reverse current flow/voltage, since the power supply can include an AC power source in some embodiments.

In this example, during the positive part of the cycle, comparator $U_1$ is used to compare an upper voltage threshold (e.g., $V_{max}$, where $V_{max}$ may be anywhere between 1 to 1.5 times $V_{main}$ s) to the load voltage ($V_{load}$). Furthermore, during the negative part of the cycle, comparator $U_2$ is used to compare $V_{load}$ to a lower voltage threshold (e.g., $V_{min}$, where $V_{min}$ may be anywhere between −1.5 to −1 times $V_{main}$ s). In some instances, $V_{max}$ may correspond to the voltage value used to trigger the start of freewheeling, e.g., if $V_{load}>V_{max}$. The comparators $U_3$ and $U_4$ are used to compare a lower current threshold (e.g., $I_{min}$, where $I_{min}=-I_{max}$) and an upper current threshold (e.g., $I_{max}$), respectively, to the freewheeling current ($I_{FW}$). In some instances, $I_{max}$ may correspond to the current value to trigger the end of freewheeling, e.g., disable or end freewheeling if $I_{FW}<I_{max}$. Similarly, comparators $U_5$ and $U_6$ are used to compare $I_{FW}$ to $I_{short\_min}$ and $I_{short\_max}$, respectively, where $I_{short\_min}$ corresponds to the minimum short circuit current and $I_{short\_max}$ corresponds to the maximum short circuit current of the freewheeling circuit. In some cases, $I_{short\_max}$ corresponds to the current value used to force the end of freewheeling, e.g., disable or end freewheeling if $I_{FW}>I_{short\_max}$, which may result due to a short circuit condition when the load is driven and freewheeling is active.

It should be noted that logic circuit 700 depicted in FIG. 7 is exemplary only and not intended to limit the spirit and/or scope of the present disclosure. Furthermore, a different circuit configuration, different resistance values, etc., besides the one depicted in FIG. 7 can be utilized in different embodiments.

For sake of simplicity, the term "$I_{max}$" may also be referred to as "$I_{load\_max}$", which corresponds to the maximum, positive load current. Additionally, the term "$I_{short\_max}$" may also be referred to as "$I_{FW\_short\_max}$", which corresponds to the maximum, positive short circuit current of the freewheeling circuit. Similarly, the term "$I_{min}$" may also be referred to as "$I_{load\_min}$", which corresponds to the minimum, negative load current. Additionally, the term "$I_{short\_min}$" may also be referred to as "$I_{FW\_short\_min}$", which corresponds to the minimum, negative short circuit current of the freewheeling circuit.

FIG. 8 illustrates an example of a logic circuit 800, according to various aspects of the disclosure. The logic circuit 800 may implement one or more aspects of the switch controller (or freewheeling controller), such as, but not limited to, control module 126, switch controller 241, and/or switch controller 341, according to various aspects of the present disclosure. The logic circuit 800 can also implement one or more aspects of the logic circuit 700 described above with reference to FIG. 7. In some aspects, FIG. 8 depicts an example of the logic that may be employed within the switch controller (or freewheeling controller), in accordance with one or more implementations of the present disclosure. It should be noted that, while FIG. 8 only depicts the conditions under which freewheeling (FW) is turned OFF, as can be appreciated, the opposite logic can be employed to turn ON freewheeling.

As shown in FIG. 8, the logic circuit 800 comprises a switch control circuit 841, where the switch control circuit 841 may include a plurality of comparators (e.g., comparators $U_1$, $U_2$, $U_3$, $U_4$, $U_5$, and/or $U_6$), which may be similar or substantially similar to the comparator(s) described in relation to FIGS. 3B-D and 7. Each of the comparators $U_1$ through $U_6$ is configured to receive a measured value (e.g., measured current, measured voltage) and a threshold value (e.g., threshold current, threshold voltage) and output a signal to turn freewheeling (FW) ON or OFF.

As shown in FIG. 8, during the positive portion of the AC cycle, FW is turned OFF if $U_1$ detects that $V_{load}$ 811>$V_{max}$ 801. Similarly, FW is turned OFF if $U_4$ detects that $I_{FW}$ 802-*a*≤$I_{load\_max}$ 812, where $I_{FW}$ 802-*a* corresponds to the positive value of the freewheeling current and $I_{load\_max}$ 812 corresponds to the maximum, positive load current. FW is also turned OFF if $U_6$ detects that $I_{FW}$ 802-*a*>$I_{FW\_short\_max}$ 813, where $I_{FW\_short\_max}$ 813 corresponds to the maximum, positive value of the short circuit current of the freewheeling circuit.

During the negative portion of the AC cycle, $V_{load}$ 831 and $I_{FW}$ 802-*b* have negative values. In such cases, the voltage and current thresholds also take on negative values. For instance, V min 820=−$V_{max}$ 801; $I_{load\_min}$ 832=−$I_{load\_max}$ 812; and $I_{FW\_short\_min}$ 833=−$I_{FW\_short\_max}$ 813.

As shown in FIG. 8, during the negative portion of the AC cycle, FW is turned OFF if $U_2$ detects that $V_{load}$ 831<$V_{min}$ 820. Similarly, FW is turned OFF if $U_3$ detects that $I_{FW}$ 802-*b*≥$I_{load\_min}$ 832, where $I_{FW}$ 802-*b* corresponds to the negative value of the freewheeling current and $I_{load\_min}$ 832 corresponds to the minimum, negative load current. FW is also turned OFF if $U_5$ detects that $I_{FW}$ 802-*b*≤$I_{FW\_short\_min}$ 833, where $I_{FW\_short\_min}$ 833 corresponds to the minimum, negative value of the short circuit current of the freewheeling circuit.

In this way, the switch control circuit 841 can receive two measured inputs (e.g., $V_{load}$, $I_{FW}$) and six thresholds (e.g., three for positive AC input, three for negative AC input) to compare the two measured inputs with to decide if freewheeling (FW) should be switched ON or OFF. In some cases, the 3 thresholds for the positive AC input include $V_{max}$, $I_{max}$ or $I_{load\_max}$, and $I_{short\_max}$ or $I_{FW\_short\_max}$. Additionally, the 3 thresholds for the negative AC input include V min, $I_{min}$ Or $I_{load}$ min, and $I_{short}$ min or $I_{FW\_short\_min}$. It should be noted that the number of thresholds and/or number of measured inputs described herein is not intended to be limiting and should not be construed as limiting the scope and/or spirit of the present disclosure.

Figure 6:
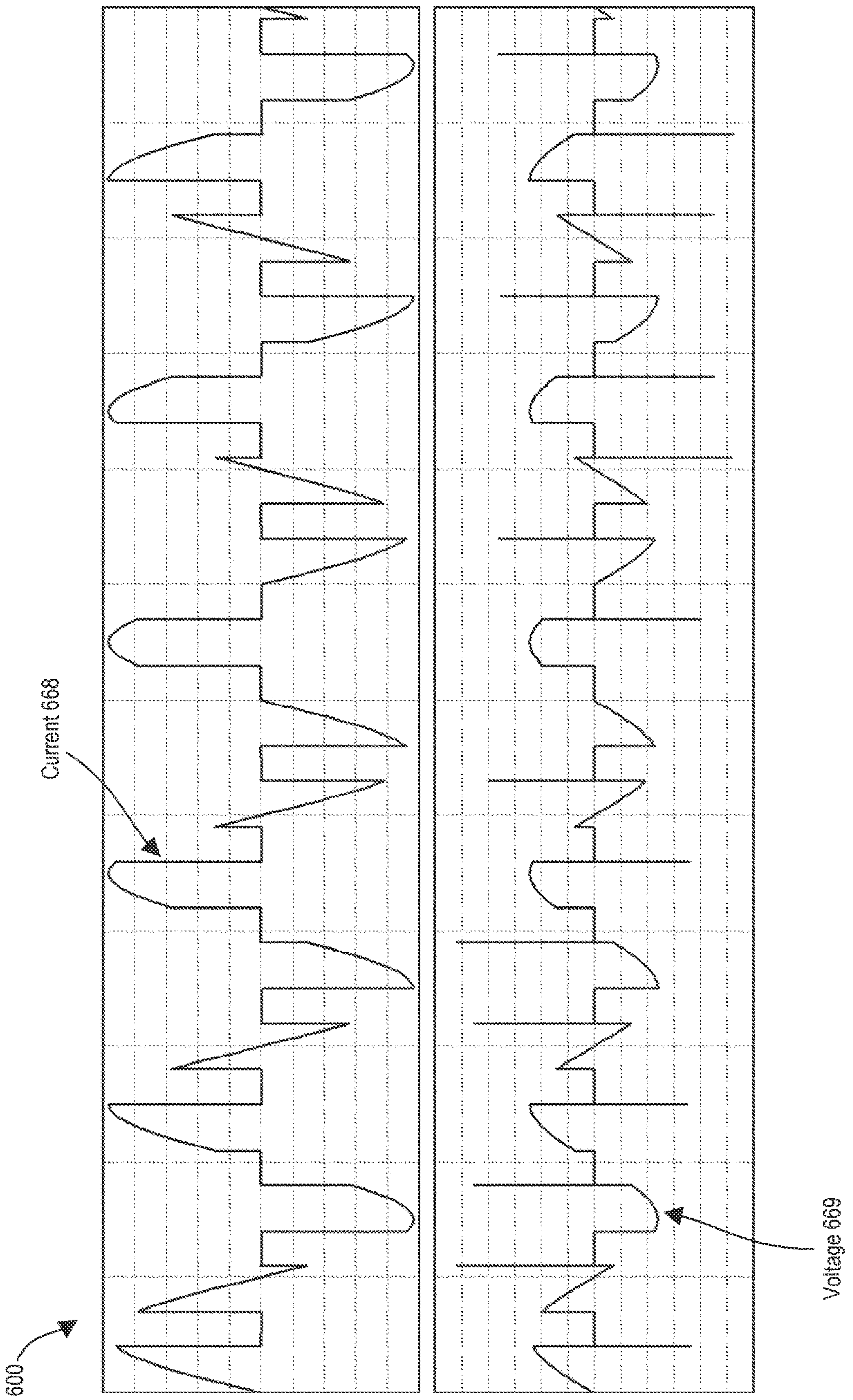
FIG. 6 illustrates a conceptual graph showing the load current and load voltage against time for the disclosed AC freewheeling technique, according to various aspects of the disclosure.

FIG. 6 illustrates a conceptual graph 600 showing a current waveform 668 and a voltage waveform 669, according to various aspects of the present disclosure. Here, the current waveform 668 corresponds to the load current (e.g., $I_{load}$ 322), while voltage waveform 669 corresponds to the load voltage (e.g., $V_{load}$ 321) seen when the disclosed freewheeling techniques are employed in a power system, in accordance with one or more implementations.

Some methods described in connection with the embodiments disclosed herein may be embodied directly in hardware, in processor-executable code encoded in a non-transitory tangible processor readable storage medium, or in a combination of the two. Referring to FIG. 5 for example, shown is a block diagram of a computer system 500 depicting physical components that may be utilized to realize the controller (e.g., control module 126; switch controllers 241 and/or 341; power controllers 207 and/or 307) according to an exemplary embodiment. As shown, in this embodiment a display portion 512 and nonvolatile memory 529 are coupled to a bus 522 that is also coupled to random access memory ("RAM") 524, a processing portion (which includes N processing components) 526, an optional field programmable gate array (FPGA) 527, and a transceiver component 528 that includes N transceivers. Although the components depicted in FIG. 5 represent physical components, FIG. 5 is not intended to be a detailed hardware diagram; thus, many of the components depicted in FIG. 5 may be realized by common constructs or distributed among additional physical components. Moreover, it is contemplated that other existing and yet-to-be developed physical components and architectures may be utilized to implement the functional components described with reference to FIG. 5.

This display portion 512 generally operates to provide a user interface (UI), and in several implementations, the display 512 may be realized by a touchscreen display. In general, the nonvolatile memory 529 is non-transitory memory that functions to store (e.g., persistently store) data and processor-executable code (including executable code that is associated with effectuating the methods, such as method 400, described herein). In some embodiments for example, the nonvolatile memory 529 includes bootloader code, operating system code, file system code, and non-transitory processor-executable code to facilitate the execution of a method described with reference to FIG. 4 described further herein.

In many implementations, the nonvolatile memory 529 is realized by flash memory (e.g., NAND or ONENAND memory), but it is contemplated that other memory types may be utilized as well. Although it may be possible to execute the code from the nonvolatile memory 529, the executable code in the nonvolatile memory is typically loaded into RAM 524 and executed by one or more of the N processing components in the processing portion 526.

The N processing components in connection with RAM 524 generally operate to execute the instructions stored in nonvolatile memory 529 to enable one or more operations described in relation to FIG. 4. For example, non-transitory, processor-executable code to effectuate the method 400 described with reference to FIG. 4 may be persistently stored in nonvolatile memory 529 and executed by the N processing components in connection with RAM 524. As one of ordinarily skill in the art will appreciate, the processing portion 526 may include a video processor, digital signal processor (DSP), micro-controller, graphics processing unit (GPU), or other hardware processing components or combinations of hardware and software processing components (e.g., an FPGA or an FPGA including digital logic processing portions).

In addition, or in the alternative, the processing portion 526 may be configured to effectuate one or more aspects of the methodologies described herein (e.g., the method 400 described with reference to FIG. 4). For example, non-transitory processor-readable instructions may be stored in the nonvolatile memory 529 or in RAM 524 and when executed on the processing portion 526, cause the processing portion 526 to perform one or more of the operations described with reference to FIG. 4. Alternatively, non-transitory FPGA-configuration-instructions may be persistently stored in nonvolatile memory 529 and accessed by the processing portion 526 (e.g., during boot up) to configure the hardware-configurable portions of the processing portion 526 to effectuate the functions of any of the power system(s) 100-*a*, 100-*b*, 200, 300-*a*, and/or 300-*b* configured for AC freewheeling. Additionally, or alternatively, non-transitory FPGA-configuration-instructions may be persistently stored in nonvolatile memory 529 and accessed by the processing portion 526 (e.g., during boot up) to configure the hardware-configurable portions of the processing portion 526 to effectuate the functions of any of the logic circuits 700 and/or 800 configured for AC freewheeling.

The input component 531 operates to receive signals (e.g., voltage margins or thresholds, current margins or thresholds, measured $V_{load}$, measured $I_{FW}$, etc.) that are indicative of one or more aspects of the detection of an overvoltage condition at an output of a power supply. The output component 532 generally operates to provide one or more analog or digital signals to effectuate an operational aspect of an overvoltage protection system for power supplies, to name one non-limiting example. For example, the output component 532 may provide the control signal 369 for enabling or disabling the freewheeling circuit 325 at the output of the power supply, as described with reference to FIG. 3. In some other cases, the freewheeling circuit can be implemented within the power controller, as described with reference to FIG. 1B. For instance, as shown in FIG. 1B, the freewheeling circuit 125 is implemented within the power controller 107. In such cases, the output component 532 may provide a control signal to enable or disable the freewheeling circuit 125 implemented within the power controller 107 of the power system 100-*b*.

The depicted transceiver component 528 includes N transceiver chains, which may be used for communicating with external devices via wireless or wireline networks. Each of the N transceiver chains may represent a transceiver associated with a particular communication scheme (e.g., Wi-Fi, Ethernet, Profibus, etc.).

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like may refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform or system (e.g., computer system 500).

As will be appreciated by one skilled in the art, aspects of the present disclosure may be embodied as a system, method, apparatus, a circuit, a controller, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

As used herein, the recitation of "at least one of A, B and C" is intended to mean "either A, B, C or any combination of A, B and C." The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (e.g., rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, components, and/or groups but do not preclude the presence or addition of one or more other features, integers, steps, operations, elements, components, and/or groups thereof. As used herein, the term "and/or" includes any and all combinations of one or more of the associated listed items and may be abbreviated as "/".

It will be understood that when an element or layer is referred to as being "on," "connected to," "coupled to," or "adjacent to" another element or layer, it can be directly on, connected, coupled, or adjacent to the other element or layer, or intervening elements or layers may be present. In contrast, when an element is referred to as being "directly on," "directly connected to," "directly coupled to," or "immediately adjacent to" another element or layer, there are no intervening elements or layers present.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

What is claimed is:

1. A freewheeling circuit for preventing over-voltage conditions, comprising:
- a switch;
- electrical damping coupled in series with the switch; and
- a freewheeling controller, wherein the freewheeling controller is configured to:
  - monitor a load voltage across a load;
  - monitor a current in the freewheeling circuit; and
  - control a state of the freewheeling circuit, based at least in part on one or more of:
    - comparing the load voltage to a voltage threshold; and
    - comparing the current to at least one current threshold.

2. The freewheeling circuit of claim 1, wherein controlling the state of the freewheeling circuit comprises:

in response to detecting that the load voltage exceeds the voltage threshold, closing the switch of the freewheeling circuit to activate freewheeling.

3. The freewheeling circuit of claim 1, wherein controlling the state of the freewheeling circuit comprises:

in response to detecting that the current is at or below a first current threshold, opening the switch of the freewheeling circuit to deactivate freewheeling.

4. The freewheeling circuit of claim 3, wherein controlling the state of the freewheeling circuit comprises:

in response to detecting that the current exceeds a second current threshold, opening the switch of the freewheeling circuit to deactivate freewheeling.

5. The freewheeling circuit of claim 4, wherein:

the first current threshold is low enough to ensure that the load voltage is below the voltage threshold when the switch is opened; and the second current threshold corresponds to a short circuit current of the freewheeling circuit.

6. The freewheeling circuit of claim 1, wherein:

and the at least one current threshold comprises a first current threshold and a second current threshold higher than the first current threshold.

7. The freewheeling circuit of claim 1, wherein the freewheeling circuit is one of:

directly coupled to the load; or integrated with a power controller, wherein the power controller is coupled between the load and a power supply; and wherein:

the load comprises an inductive load, the power supply comprises one of an alternating current (AC) power supply or a pulsed power supply, and the electrical damping comprises at least one resistor.

8. The freewheeling circuit of claim 1, wherein controlling the state of the freewheeling circuit comprises:

in response to detecting that a power controller coupled to a power supply is turned ON while freewheeling is active, opening the switch of the freewheeling circuit to deactivate freewheeling.

9. A freewheeling circuit for preventing over-voltage conditions, comprising:

a switch;

electrical damping coupled in series with the switch;

a processor; and a non-transitory, tangible computer readable storage medium, encoded with processor readable instructions for preventing over-voltage conditions, the instructions comprising instructions for:

monitoring a load voltage across a first and second power rails;

monitoring a freewheeling current in the switch; and controlling a state of the freewheeling circuit, based at least in part on one or more of:

comparing the load voltage to a voltage threshold; and comparing the freewheeling current to at least one current threshold.

10. The freewheeling circuit of claim 9, comprising an inductive load coupled across the first and second power rails, wherein:

the at least one current threshold comprises a first current threshold and a second current threshold higher than the first current threshold; and wherein controlling the state of the freewheeling circuit comprises:

in response to detecting that the load voltage exceeds the voltage threshold, closing a switch of the freewheeling circuit to activate freewheeling;

in response to detecting that the freewheeling current is at or below the first current threshold, opening the switch of the freewheeling circuit to deactivate freewheeling; and in response to detecting that the freewheeling current exceeds a second current threshold, opening the switch of the freewheeling circuit to deactivate freewheeling.

11. The freewheeling circuit of claim 9, wherein controlling the state of the freewheeling circuit comprises:

in response to detecting that the load voltage exceeds the voltage threshold, closing the switch of the freewheeling circuit to activate freewheeling.

12. The freewheeling circuit of claim 9, wherein controlling the state of the freewheeling circuit comprises:

in response to detecting that the current is at or below a first current threshold, opening the switch of the freewheeling circuit to deactivate freewheeling.

13. The freewheeling circuit of claim 12, wherein controlling the state of the freewheeling circuit comprises:

in response to detecting that the current exceeds a second current threshold, opening the switch of the freewheeling circuit to deactivate freewheeling.

14. The freewheeling circuit of claim 13, wherein:

the first current threshold is low enough to ensure that the load voltage is below the voltage threshold when the switch is opened; and the second current threshold corresponds to a short circuit current of the freewheeling circuit.

15. The freewheeling circuit of claim 9, wherein:

the at least one current threshold comprises a first current threshold and a second current threshold higher than the first current threshold.

16. The freewheeling circuit of claim 9, wherein the freewheeling circuit is one of:

directly coupled to a load; or integrated with a power controller, wherein the power controller is coupled between the load and a power supply; and wherein:

the load comprises an inductive load, the power supply comprises one of an alternating current (AC) power supply or a pulsed power supply, and the electrical damping comprises at least one resistor.

17. The freewheeling circuit of claim 9, wherein controlling the state of the freewheeling circuit comprises:

in response to detecting that a power controller coupled to a power supply is turned ON while freewheeling is active, opening the switch of the freewheeling circuit to deactivate freewheeling.

* * * * *